(12) United States Patent
Itoh

(10) Patent No.: US 8,928,799 B2
(45) Date of Patent: *Jan. 6, 2015

(54) IMAGING DEVICE AND IMAGING METHOD TO PERFORM AUTOFOCUS OPERATION TO A SUBJECT

(71) Applicant: Ricoh Company, Ltd., Tokyo (JP)

(72) Inventor: Kei Itoh, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 91 days.

This patent is subject to a terminal disclaimer.

(21) Appl. No.: 13/651,013

(22) Filed: Oct. 12, 2012

(65) Prior Publication Data
US 2013/0093941 A1   Apr. 18, 2013

(30) Foreign Application Priority Data
Oct. 13, 2011   (JP) .................................. 2011-225463

(51) Int. Cl.
H04N 5/232 (2006.01)
G03B 13/00 (2006.01)
H04N 5/225 (2006.01)
H04N 5/347 (2011.01)
H04N 5/345 (2011.01)
H04N 5/235 (2006.01)
H04N 5/351 (2011.01)

(52) U.S. Cl.
CPC .......... *H04N 5/23245* (2013.01); *H04N 5/347* (2013.01); *H04N 5/3456* (2013.01); *H04N 5/23212* (2013.01); *H04N 5/2351* (2013.01); *H04N 5/351* (2013.01); *H04N 5/23293* (2013.01); *H04N 5/23296* (2013.01)
USPC ........................................ 348/349; 348/216.1

(58) Field of Classification Search
CPC . H04N 5/23212; H04N 5/2351; H04N 5/341; H04N 5/3452; H04N 5/3454; H04N 5/347; H04N 5/351
USPC ........................... 348/216.1, 220.1, 345, 349
See application file for complete search history.

(56) References Cited

U.S. PATENT DOCUMENTS

| 6,972,798 | B1 * | 12/2005 | Takei ............................ 348/349 |
| 8,159,597 | B2 * | 4/2012 | Ono ............................... 348/345 |
| 8,243,191 | B2 * | 8/2012 | Uchida .......................... 348/353 |
| 8,502,913 | B2 * | 8/2013 | Nakayama ..................... 348/364 |
| 2004/0252224 | A1 | 12/2004 | Shiraishi et al. |
| 2008/0122943 | A1 | 5/2008 | Itoh |

(Continued)

FOREIGN PATENT DOCUMENTS

| EP | 1879378 A2 | 1/2008 |
| EP | 2445194 A2 | 4/2012 |

(Continued)

*Primary Examiner* — John Villecco
(74) *Attorney, Agent, or Firm* — Oblon, Spivak, McClelland, Maier & Neustadt, L.L.P.

(57) ABSTRACT

An imaging device includes an imaging lens, an image sensor to output an image signal in accordance with an image of a subject captured via the imaging lens, a lens driver to move the imaging lens, an autofocus detector to determine a focal point according to image data obtained from the image signal, a point source detector to determine whether or not a subject is a point source subject on the basis of a brightness component included in the image data, and a driving mode setter to change a driving condition of the image sensor when the subject is determined to be a point source subject.

5 Claims, 18 Drawing Sheets

(56) References Cited

U.S. PATENT DOCUMENTS

| | | |
|---|---|---|
| 2008/0225158 A1 | 9/2008 | Ito |
| 2010/0214447 A1 | 8/2010 | Itoh |
| 2011/0157425 A1* | 6/2011 | Nakayama .................... 348/234 |
| 2011/0205403 A1* | 8/2011 | Ito ................................ 348/241 |
| 2011/0305446 A1 | 12/2011 | Itoh |
| 2012/0033957 A1 | 2/2012 | Itoh |
| 2012/0105710 A1 | 5/2012 | Itoh et al. |
| 2012/0162494 A1* | 6/2012 | Nakamura .................... 348/345 |
| 2012/0195580 A1 | 8/2012 | Itoh |
| 2013/0107107 A1* | 5/2013 | Ohbuchi et al. ............... 348/349 |
| 2013/0201386 A1* | 8/2013 | Ohbuchi et al. ............... 348/349 |
| 2013/0300886 A1* | 11/2013 | Nakayama ................. 348/216.1 |
| 2013/0335619 A1* | 12/2013 | Itoh ............................... 348/349 |

FOREIGN PATENT DOCUMENTS

| | | |
|---|---|---|
| JP | 39-005265 | 4/1964 |
| JP | 2004-242045 | 8/2004 |
| JP | 2005-122016 | 5/2005 |
| JP | 2005-140995 | 6/2005 |
| JP | 2005-227750 | 8/2005 |
| JP | 2006-053493 | 2/2006 |
| JP | 2006189634 A * | 7/2006 |
| JP | 2006-243101 | 9/2006 |
| JP | 2006-349908 | 12/2006 |
| JP | 2007033735 A * | 2/2007 |
| JP | 2007-133044 | 5/2007 |
| JP | 2007-336249 | 12/2007 |
| JP | 2008-008959 | 1/2008 |
| JP | 2008-020847 | 1/2008 |
| JP | 2008-052022 | 3/2008 |
| JP | 2008-067136 | 3/2008 |
| JP | 2008-070795 | 3/2008 |
| JP | 2008-136035 | 6/2008 |
| JP | 2008-175995 | 7/2008 |
| JP | 2008-203791 | 9/2008 |
| JP | 2009-031702 | 2/2009 |
| JP | 2009-198817 | 9/2009 |
| JP | 2010-025985 | 2/2010 |
| JP | 2010-122410 | 6/2010 |
| JP | 2010-220206 | 9/2010 |
| JP | 2010286791 A * | 12/2010 |
| JP | 2011-043789 | 3/2011 |
| JP | 2011-138103 | 7/2011 |
| JP | 2011-166407 | 8/2011 |
| JP | 2011150281 A * | 8/2011 |
| JP | 2011-257769 | 12/2011 |
| JP | 2012-002951 | 1/2012 |
| JP | 2012-053029 | 3/2012 |
| JP | 2012-093409 | 5/2012 |
| JP | 2012-098594 | 5/2012 |
| JP | 2012-141240 | 7/2012 |
| JP | 2012-145813 | 8/2012 |
| JP | 2013148678 A * | 8/2013 |
| WO | WO 2011/068234 A1 | 6/2011 |

* cited by examiner

FIG.12

| Y1 | Y2 | Y3 | Y4 | Y5 | Y6 | Y7 | Y8 | Y9 | Y10 | Y11 | Y12 | Y13 | Y14 | Y15 | Y16 |
|---|---|---|---|---|---|---|---|---|---|---|---|---|---|---|---|
| Y17 | Y18 | Y19 | Y20 | Y21 | Y22 | Y23 | Y24 | Y25 | Y26 | Y27 | Y28 | Y29 | Y30 | Y31 | Y32 |
| Y33 | Y34 | Y35 | Y36 | Y37 | Y38 | Y39 | Y40 | Y41 | Y42 | Y43 | Y44 | Y45 | Y46 | Y47 | Y48 |
| Y49 | Y50 | Y51 | Y52 | Y53 | Y54 | Y55 | Y56 | Y57 | Y58 | Y59 | Y60 | Y61 | Y62 | Y63 | Y64 |
| Y65 | Y66 | Y67 | Y68 | Y69 | Y70 | Y71 | Y72 | Y73 | Y74 | Y75 | Y76 | Y77 | Y78 | Y79 | Y80 |
| Y81 | Y82 | Y83 | Y84 | Y85 | Y86 | Y87 | Y88 | Y89 | Y90 | Y91 | Y92 | Y93 | Y94 | Y95 | Y96 |
| Y97 | Y98 | Y99 | Y100 | Y101 | Y102 | Y103 | Y104 | Y105 | Y106 | Y107 | Y108 | Y109 | Y110 | Y111 | Y112 |
| Y113 | Y114 | Y115 | Y116 | Y117 | Y118 | Y119 | Y120 | Y121 | Y122 | Y123 | Y124 | Y125 | Y126 | Y127 | Y128 |
| Y129 | Y130 | Y131 | Y132 | Y133 | Y134 | Y135 | Y136 | Y137 | Y138 | Y139 | Y140 | Y141 | Y142 | Y143 | Y144 |
| Y145 | Y146 | Y147 | Y148 | Y149 | Y150 | Y151 | Y152 | Y153 | Y154 | Y155 | Y156 | Y157 | Y158 | Y159 | Y160 |
| Y161 | Y162 | Y163 | Y164 | Y165 | Y166 | Y167 | Y168 | Y169 | Y170 | Y171 | Y172 | Y173 | Y174 | Y175 | Y176 |
| Y177 | Y178 | Y179 | Y180 | Y181 | Y182 | Y183 | Y184 | Y185 | Y186 | Y187 | Y188 | Y189 | Y190 | Y191 | Y192 |
| Y193 | Y194 | Y195 | Y196 | Y197 | Y198 | Y199 | Y200 | Y201 | Y202 | Y203 | Y204 | Y205 | Y206 | Y207 | Y208 |
| Y209 | Y210 | Y211 | Y212 | Y213 | Y214 | Y215 | Y216 | Y217 | Y218 | Y219 | Y220 | Y221 | Y222 | Y223 | Y224 |
| Y225 | Y226 | Y227 | Y228 | Y229 | Y230 | Y231 | Y232 | Y233 | Y234 | Y235 | Y236 | Y237 | Y238 | Y239 | Y240 |
| Y241 | Y242 | Y243 | Y244 | Y245 | Y246 | Y247 | Y248 | Y249 | Y250 | Y251 | Y252 | Y253 | Y254 | Y255 | Y256 |

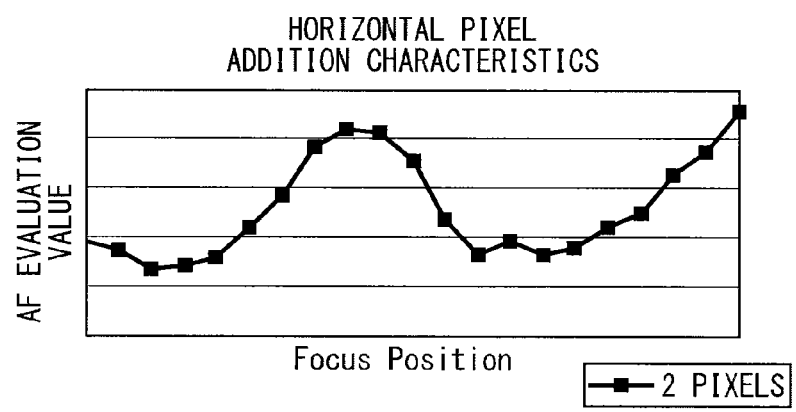

IMAGING DEVICE AND IMAGING METHOD TO PERFORM AUTOFOCUS OPERATION TO A SUBJECT

CROSS REFERENCE TO RELATED APPLICATION

The present application is based on and claims priority from Japanese Patent Application No. 2011-225463, filed on Oct. 13, 2011, the disclosure of which is hereby incorporated by reference in its entirety.

BACKGROUND OF THE INVENTION

1. Field of the Invention

The present invention relates to an imaging device with an autofocus function and an imaging method, in particular, to an imaging device which can accurately perform autofocus operation to a subject as a night scene in which point sources are a dominant subject.

2. Description of the Related Art

An imaging device as a digital camera having an autofocus (AF) unit is known. Such an AF unit generates image data from the image signals of a subject obtained via an image sensor, generates data to automatically decide an in-focus position according to the image data, and moves an imaging lens to the in-focus position.

There are several types of AF operation of the AF unit. The AF unit incorporated in a general imaging device uses a hill climb AF system (for example, disclosed in Japanese Patent Application Publication No. S39-5265). The hill climb AF system is to calculate an integral value of a difference in brightness of neighboring pixels from an image signal output from an image sensor and determine an in-focus position using the integral value. This integral value is referred to as AF evaluation value.

When an imaging lens is in a position to capture a subject in focus, the outline of a subject image on the light-receiving surface of the image sensor is sharp so that a difference in brightness between the neighboring pixels of image signals of the subject image is large. Larger AF evaluation values are obtained in the in-focus state. Meanwhile, the outline of a subject not in focus is blurred so that a difference in brightness between the neighboring pixels is small and so is the AF evaluation value.

The hill climb AF system is to detect a peak of the AF evaluation value on the basis of the above principle to automatically focus a subject. The hill climb type AF unit obtains an image signal at certain timing or interval while moving the imaging lens, calculates the AF evaluation value, and identifies a lens position where the AF evaluation value is maximal or at peak. A subject can be automatically focused by moving the imaging lens to the lens position having the maximal AF evaluation value.

The hill climb AF system moves the imaging lens all over a moving range once and finds a lens position with the maximal AF evaluation value in the range, and moves the lens to the lens position.

Specifically, the lens start position in AF operation is set to the center of the moving range. First, the imaging lens is moved to the center of the moving range. Then, the lens is moved in a certain direction, for example, to the closest in-focus position, and then reversely moved to the infinite in-focus position. The AF evaluation value is calculated at certain timing in this moving range to identify the lens position with the maximal AF evaluation value.

Recent image sensors improved resolution and some of them have several hundred mega pixels. As the number of pixels of an image sensor increases, its pixel pitch narrows and sensitivity deteriorates. In view of this, image sensors generally include a driving mode or condition in which a signal output from each pixel of a subject image on the light receiving surface is added under a predetermined condition to double brightness and increase sensitivity.

This pixel adding mode is used in preview operation in which subject images are displayed on an LCD with a certain interval. It is suitable for the preview operation since the number of pixels used for display data is reduced from the total pixel number because of the pixel addition.

FIG. 21 shows a typical pixel array of an image sensor 10, that is, Bayer array. A signal read from each pixel of the image sensor is added vertically and horizontally, thereby reducing the number of signals used in the following processing. For example, to generate image data for the preview operation, the number of signals can be reduced by addition and thinning under a certain rule instead of processing every one of signals output from all the pixels. FIG. 17 shows an example of the signal read from the image sensor 10 in a driving mode in which two pixels are added in vertical and horizontal directions.

Such a pixel addition may derange the AF evaluation value depending on the type of a subject. This is because the original spatial frequency bandwidth of an image is reduced by the pixel addition.

This pixel addition affects the autofocus processing differently at shooting during daytime or at night. For example, at daytime shooting, the contrast of each subject is sharply captured in a light ambient condition. However, at night shooting, the whole subject is dark in a dark ambient condition. In capturing a subject including a building, for example, light such as illumination leaking from the windows of a room becomes a dominant subject in an image. Such illumination leaking from a building is seen as points from distance so that such a dominant point-like subject is referred to as point source subject.

The point source subject has almost no contrast. Therefore, the curve of the AF evaluation value of the point source subject does not show a peak as shown in FIG. 22, so that the maximal AF evaluation value cannot be determined. Further, the AF evaluation value becomes lowest at the lens position which would be an in-focus position at daytime shooting. This is because light appears to expand as the degree of out-of focus increases.

In view of this, Japanese Patent No. 4679179 discloses an imaging device which can accurately perform autofocus at low brightness by multiplying filters to output the AF evaluation value. In shooting a point source subject with this imaging device, the narrowed frequency bandwidth by the pixel addition and the multiplied filters make autofocus further difficult.

Further, Japanese Patent No. 4553570 discloses an imaging device which can improve autofocus accuracy by removing high brightness portions (point sources) from an image. However, at night shooting, the removal of point sources makes it difficult to detect a focal point since the brightness around the point sources is low.

Although the contrast of a subject including dominant or saturated point sources is low, it is possible to detect the peak of the AF evaluation value by reducing the number of horizontal pixel additions of the image sensor.

FIG. 23 shows changes in the AF evaluation value at horizontal one, two, three, and four pixel addition. It can be seen from the drawing that the curve at one pixel addition does not exhibit a peak but the peak of the AF evaluation value appears while reducing the number of horizontal pixel additions.

Thus, relative to subjects with small contrast such as a punctuate subject, the AF evaluation value with no peak is caused by the number of pixel additions rather than the point source. However, the sensitivity of the image sensor lowers by reducing the number of pixel additions or performing no pixel addition. Therefore, it is required to obtain the peak of the AF evaluation value of a point source subject without a decrease in the sensitivity.

SUMMARY OF THE INVENTION

The present invention aims to provide an imaging device and an imaging method which can accurately perform autofocus to a subject such as a night scene including dominant point sources.

According to one embodiment, an imaging device comprises an imaging lens, an image sensor to output an image signal in accordance with an image of a subject captured via the imaging lens, a lens driver to move the imaging lens, an autofocus detector to determine a focal point according to image data obtained from the image signal, a point source detector to determine whether or not a subject is a point source subject on the basis of a brightness component included in the image data, and a driving mode setter to change a driving condition of the image sensor when the subject is determined to be a point source subject.

BRIEF DESCRIPTION OF THE DRAWINGS

Features, embodiments, and advantages of the present invention will become apparent from the following detailed description with reference to the accompanying drawings:

FIG. 12 shows an example of brightness detection area of the imaging device;

FIG. 24A to 24C shows the changes in the AF evaluation value by horizontal two pixel addition, horizontal four pixel addition, and no addition, respectively.

DETAILED DESCRIPTION OF EMBODIMENTS

Hereinafter, embodiments of the present invention will be described in detail with reference to the accompanying drawings. Wherever possible, the same reference numbers will be used throughout the drawings to refer to the same or like parts.

First Embodiment

Figure 1:
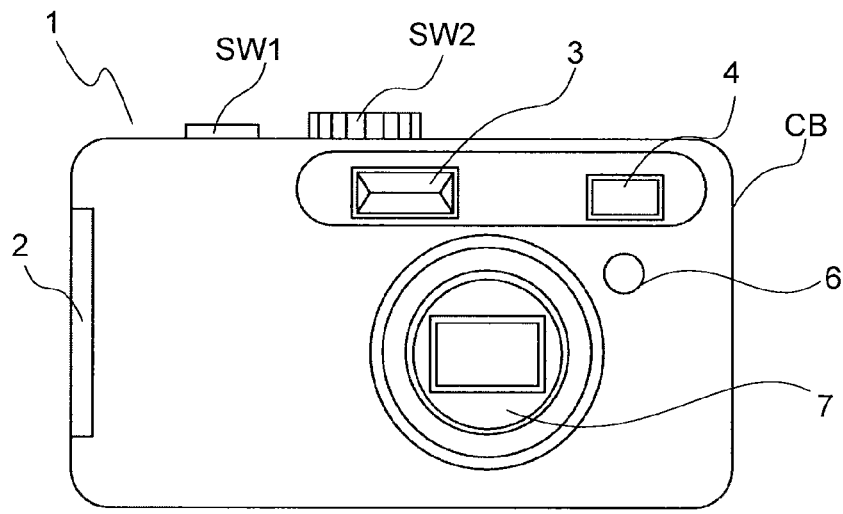
FIG. 1 is a front view of a digital camera as an example of imaging device according to one embodiment of the present invention.
Figure 2:
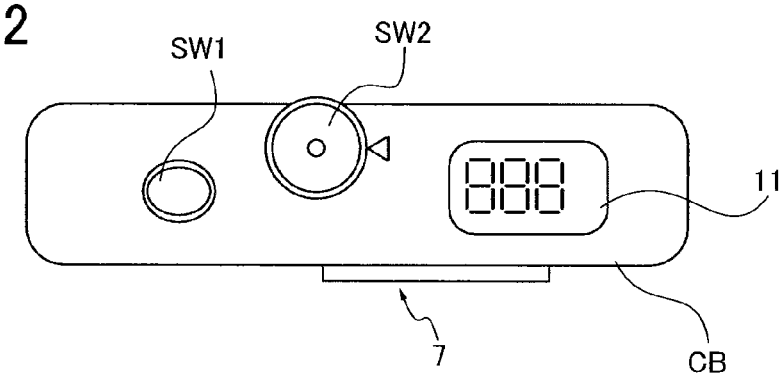
FIG. 2 is a top view of the digital camera.
Figure 3:
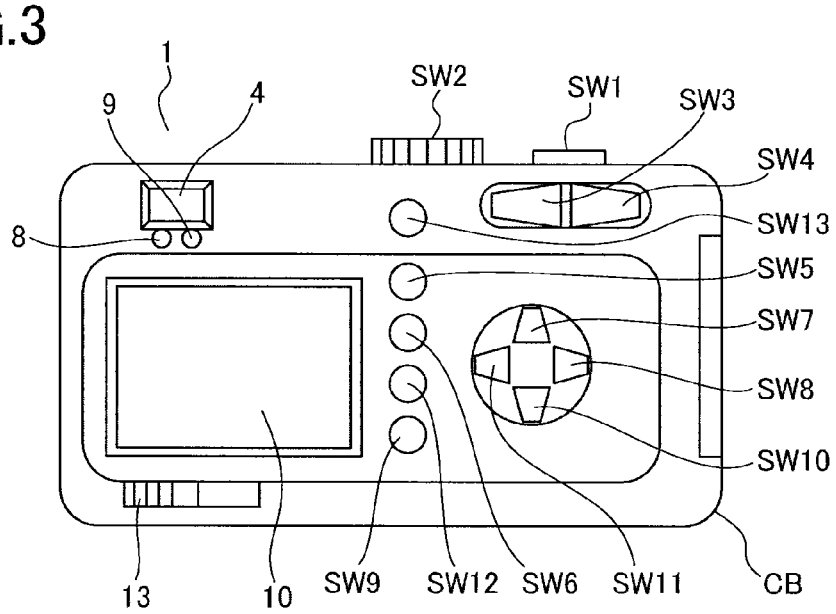
FIG. 3 is a back view of the digital camera.

FIGS. 1 to 3 show the exterior of a digital camera as imaging device according to one embodiment of the present invention, from front, top, back, respectively. In FIG. 1 a strobe light unit 3, an optical viewfinder 4, a remote control light receiver 6, a lens barrel unit 7 including an imaging lens are provided on the front of a camera body CB as a housing of the imaging device. A lid of a memory card/battery room 2 is provided on one side of the camera body CB.

As shown in FIG. 2, on the top face of the camera body CB provided are a shutter button SW1, a mode dial SW2 and a sub liquid crystal display (LCD) 11.

In FIG. 3, on the back face of the camera body CB provided are the eye contact of the optical viewfinder 4, an autofocus light emitting diode (LED) 8, a stroboscopic LED 9, an LCD 10, a power switch 13, a wide-angle zoom switch SW3, a telescopic zoom switch SW4, a self-timer set/reset switch SW5, a menu switch SW6, an upward/strobe switch SW7, a rightward switch SW8, a display switch SW9, a downward/macro switch SW10, a leftward/image check switch SW11, an OK switch SW12 and a quick access switch SW13.

Figure 4:
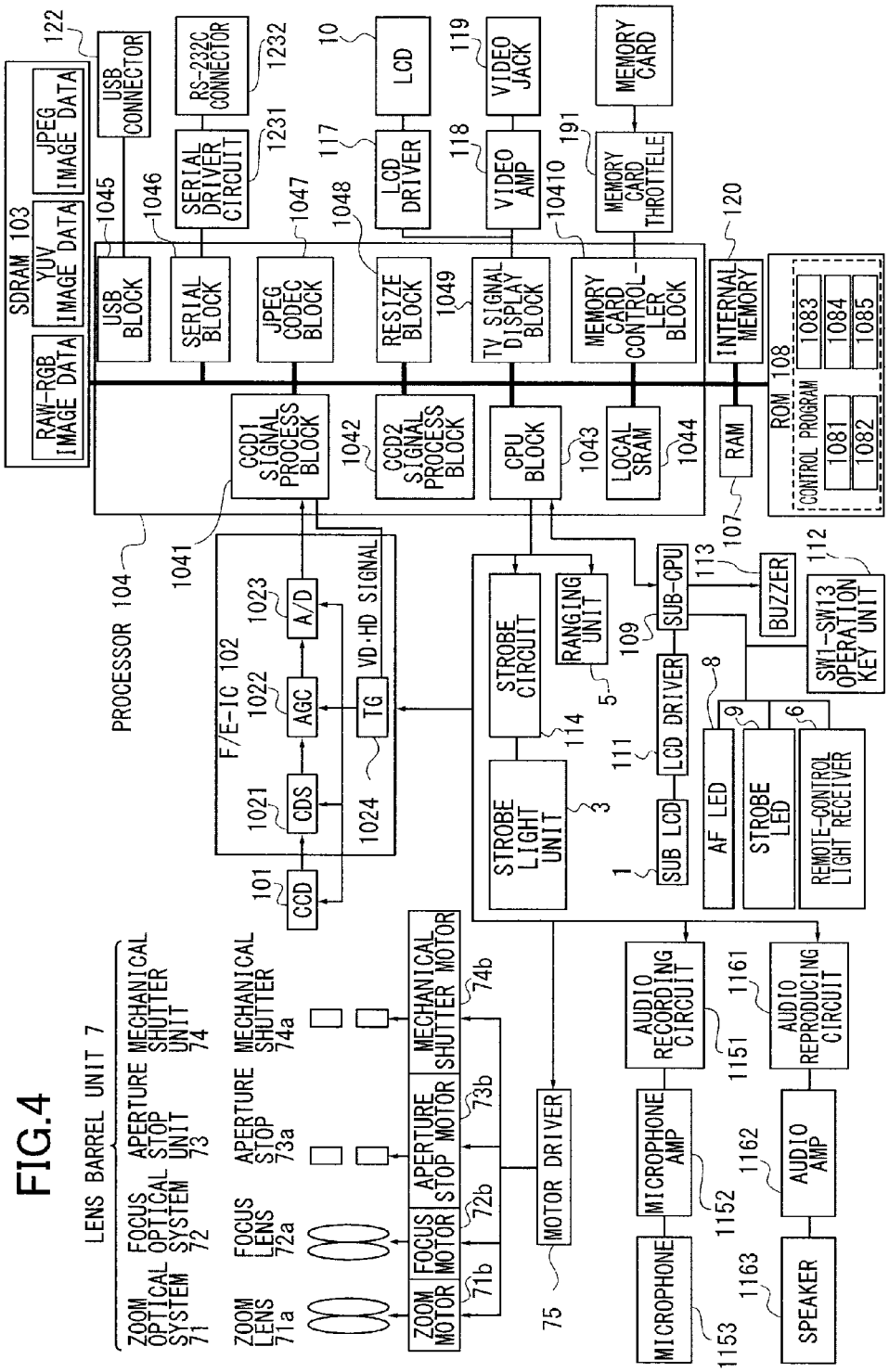
FIG. 4 is a function block diagram of the electric control system of the imaging device by way of example.

Next, the function blocks of the imaging device 1 are described with reference to FIG. 4 by way of example. The operations (functions) of the imaging device are controlled by a processor 104 as a digital signal processing integrated circuit (IC). The processor 104 comprises a first charge coupled device (CCD1) signal processing block 1041, a second CCD (CCD2) signal processing block 1042, a CPU block 1043, a local SRAM (static random access memory) 1044, a USB (universal serial bus) block 1045, a serial block 1046, a JPEG CODEC block 1047, a resize block 1048, a TV signal display block 1049 and a memory card controller block 10410. These blocks are connected with each other by bus lines.

Outside of the processor 104, an SDRAM 103 (synchronous random access memory), a RAM 107, an internal memory 120, a ROM 108 which stores a control program are provided and connected to the processor 104 via a bus line. The SDRAM 103 stores RAW-RGB image data, YUV image data and JPEG image data of a captured subject image which will be collectively referred to as image data. The control program in the ROM 108 includes a program to control the operation of the imaging device 1.

The lens barrel unit 7 comprises a zoom optical system 71 having a zoom lens 71a, a focus optical system 72 having a focus lens 72a, an aperture stop unit 73 having an aperture stop 73a and a mechanical shutter unit 74 having a mechanical shutter 74a, which constitutes an imaging optical system.

The optical zoom system 71, optical focus system 72, aperture stop unit 73 and mechanical shutter unit 74 are driven by a zoom motor 71b, a focus motor 72b, an aperture stop motor 73b and a mechanical shutter motor 74b, respectively. These motors are driven by a motor driver 75 which is controlled by the CPU block 1043 of the processor 104. The zoom motor 71b and the focus motor 72b are to move an imaging lens.

The zoom lens 71a and the focus lens 72a constitute the imaging lens which focuses a subject image on the light receiving surface of the CCD 101. The CCD 101 is an image sensor to convert the subject image into an electric image signal and output the image signal to an F/E (front end)-IC 102.

The F/E-IC 102 includes a correlated double sampling (CDS) 1021, an automatic gain controller (AGC) 1022 and an analog-digital (A/D) converter 1023 to perform predetermined processings to the image signal, respectively. It also includes a timing generator (TG) 1024 to which a vertical drive (VD) signal and a horizontal drive (HD) signal are input from the first CCD signal processing block 1041 of the processor 104. The F/F-IC 102 processes image signals in synchronization with the VD/HD signals via the TG 1024. The F/E-IC 102 converts the electric image signal from the CCD 101 into a digital signal and outputs it to the first CCD signal processing block 1041.

The first CCD signal processing block 1041 performs signal processing such as white balance adjustment, γ adjustment to the digital image signal from the CCD and outputs the VD/HD signals.

The CPU block 1043 of the processor 104 is configured to control an audio recording of an audio recording circuit 1151. Audio is converted into an audio recording signal by a microphone 1153, amplified by a microphone amplifier 1152 and recorded on the internal memory 120.

The CPU block 1043 also controls the operations of an audio reproducing circuit 1161. The audio reproducing circuit 1161 is configured to read audio data from the internal memory 120 and amplifies it with an audio amplifier 1162 for outputs from a speaker 1163. The CPU block 1043 also controls a stroboscopic circuit 114 to emit light from the strobe light unit 3.

The CPU block 1043 is connected to a sub-CPU 109 disposed outside the processor 104 and the sub CPU 109 controls display on the sub LCD 1 via an LCD driver 111. The sub CPU 109 is connected with the autofocus LED 8, the strobe LED 9, the remote-control light receiver 6, an operation key unit having the switches SW1 to SW13, and a buzzer 113.

The USB block 1045 is connected to a USB connector 122, and the serial block 1046 is connected to a RS-232C connector 1232 through a serial driver circuit 1231. The TV signal display block 1049 is connected to the LCD 10 via an LCD driver 117 and to a video jack 119 via a video amplifier 118. The memory card controller block 10410 is connected to a contact point between a memory card throttle 191 and a memory card to electrically connect with the memory card when mounted in the throttle 191 and store an image file in the memory card.

Next, the operation of the imaging device 1 is described. By setting a recording mode with the mode dial SW2, the imaging device 1 starts operating in the recording mode. Specifically, the CPU block 1043 detects the on-state of the mode dial SW2 of the operation unit 112 via the sub-CPU 109 and controls the motor driver 75 to move the lens barrel unit 7 to a photographable position. Further, it supplies power to the CCD 101, F/E-IC 102, and LCD 10 to start operating. Upon the power-on, the imaging device 1 starts operating in a viewfinder mode.

In the viewfinder mode, light from the subject is incident on the CCD 101 via the imaging lens of the lens barrel unit 7, converted into an electric image signal thereby and output as RGB analog signals to the CDS 1021. Then, the RGB analog signals are transmitted via the AGC 1022 to the A/D converter 1023 and converted thereby into digital image signals. The RGB signals in the digital image signals are converted into YUV image data by a YUV converter of the second CCD signal processing block 1042 and stored in the SDRAM 103. The second CCD signal processing block 1042 converts the RGB image data into the YUV image data by proper processing such as filtering.

The YUV image data are transmitted by the CPU block 1043 to the video amplifier 118 and video jack 119 via the TV signal display block 1049 and displayed on a television set.

The CPU block 1043 reads YUV image data from the SDRAM 103 and transmits it to the LCD 10 for display. A process from the incidence of light from the subject to the display on the LCD 10 is repeated at an interval of 1/30 second, and the display of the subject on the LCD 10 is updated in every 1/30 second in the viewfinder mode.

The CCD 101 can be set in several driving modes to change the output condition of image signals from the CCD 101. The driving modes are, for example, a first driving mode in which neither vertical pixel addition and thinning nor horizontal addition and thinning are performed, a second driving mode in which horizontal two pixel addition and vertical two pixel addition are performed, a third driving mode in which horizontal four pixel addition and vertical two pixel thinning are performed, and a fourth driving mode in which vertical four pixel addition and no horizontal pixel addition and thinning are performed.

The first driving mode is used in still image shooting. In the first driving mode an image signal is output from all the pixels so that a sharp image can be generated. However, it is not suitable for the viewfinder mode in which image data are generated for display on the LCD 10 at a predetermined interval since an image is processed using the image signals from all the pixels and the image signals concurrently output from all the pixels cannot be collectively processed so that the image signals need to be divided into frames for transfer.

Thus, in the viewfinder mode the CCD 101 is set in the third driving mode. In the third driving mode the sensitivity of read pixels is increased while the number thereof is reduced. The second and fourth driving modes are described later.

In the viewfinder mode, upon a press to the shutter button SW1, the AF evaluation value is calculated on the basis of digital RGB image data sent to the first CCD signal processing block 1041. The AF evaluation value indicates the degree of focus of a subject image on the light receiving surface of the CCD 101 and is used in the AF operation or focus detection of an autofocus detector.

Now, the AF evaluation value is described. The image of a subject in focus exhibits a sharp edge so that the high spatial frequency components included in image data in focus is maximal. The AF evaluation value is calculated according to image data and reflects the level of high frequency components as a derivative value relative to a change amount, for example.

Therefore, the position of the focus lens 72a at which image data with the maximal AF evaluation value is obtained can be set to the in-focus position. If several maximal AF evaluation values are found, the magnitude of the AF evaluation values at peak and the falling or rising degree of their peripheral values are taken into account to estimate the most reliable maximal value.

A highpass filter is used for the image data used in the calculation of AF evaluation value to make the high frequency components of image data sharp. The highpass filter can be for example a (−1, 2, −1) filter. The value found by multiplying the image data by this filter in horizontal direction is the AF evaluation value.

Figure 5:
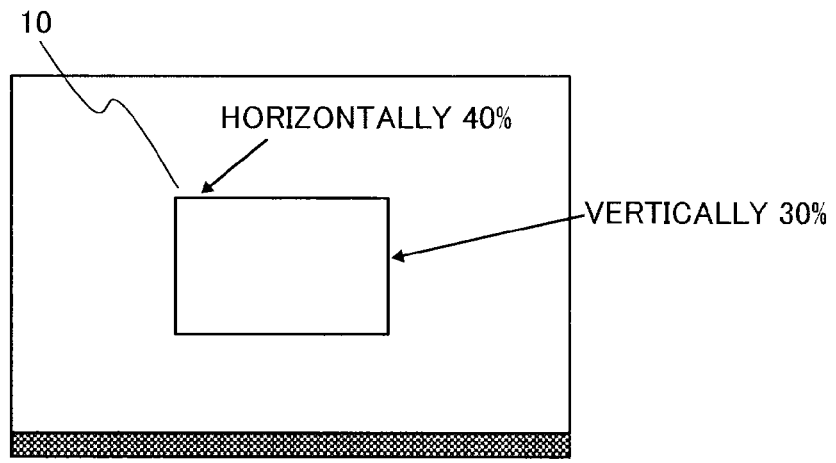
FIG. 5 shows a general autofocus frame on the display of the imaging device.

The image data used in the calculation of the AF evaluation value can be not of the entire pixel area but of a specific area or AF area of the digital RGB image data. FIG. 5 shows an example of image display on the LCD 10 in the viewfinder mode. In FIG. 5 a frame about the center of the LCD 10 is an AF area of the imaging device 1. The AF area is set to be in an area of 40% of RGB image data in horizontal direction and 30% thereof in vertical direction.

Next, a relation between the driving timing of the focus lens 72a and the calculation timing of the AF evaluation value is described. The focus lens 72a is moved by each VD signal. The moving amount thereof corresponds with a predetermined number of drive pulses when the focus motor 72b is a pulse motor.

In response to a falling of the VD signal pulse, the focus lens 72a is driven at a predetermined pulse rate by the predetermined number of drive pulses. The focus lens is driven in synchronization with the VD signal pulse or in a frame cycle.

Figure 20:
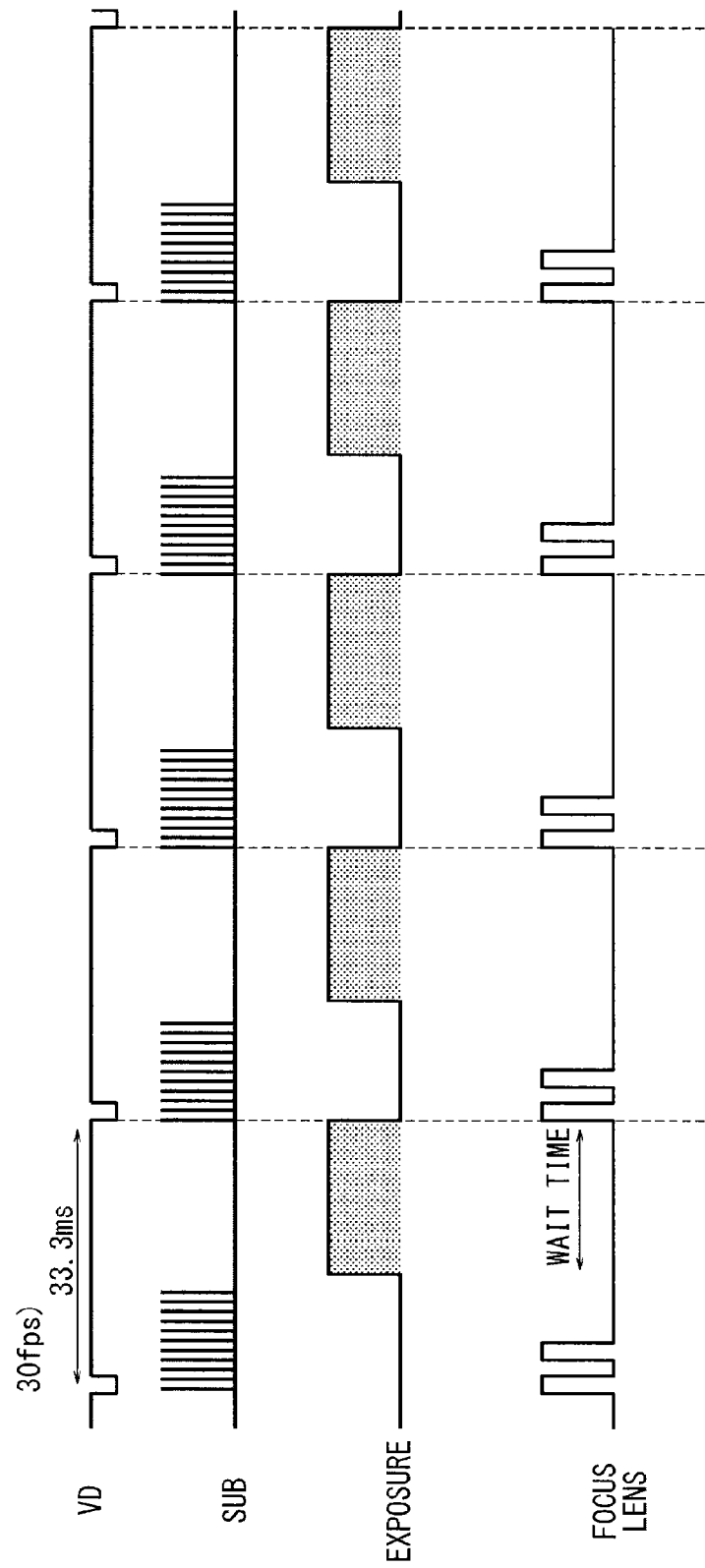
FIG. 20 is a timing chart for VD signal at capturing image data, charge discharging pulses, exposure, and focus lens driving.
Figure 21:
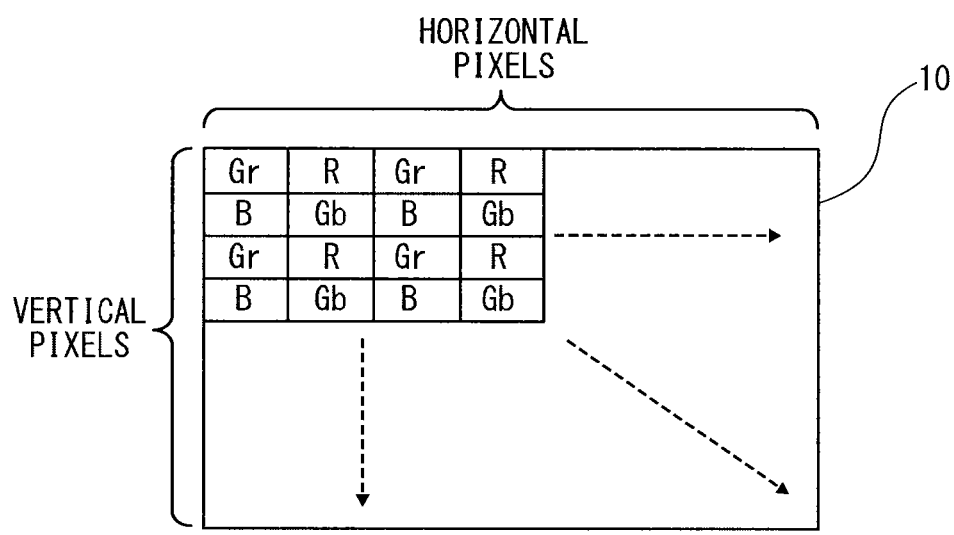
FIG. 21 shows an example of pixel array pattern of the image sensor of the imaging device.
Figure 22:
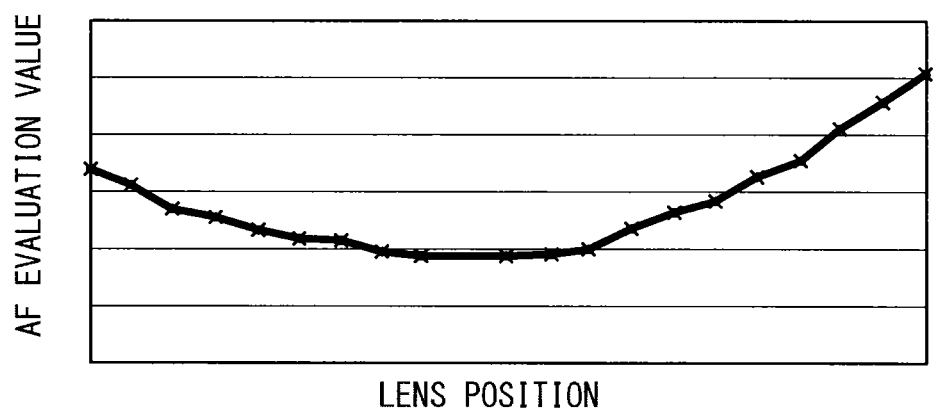
FIG. 22 is a graph showing a change in the AF evaluation value of a point source subject by way of example.
Figure 23:
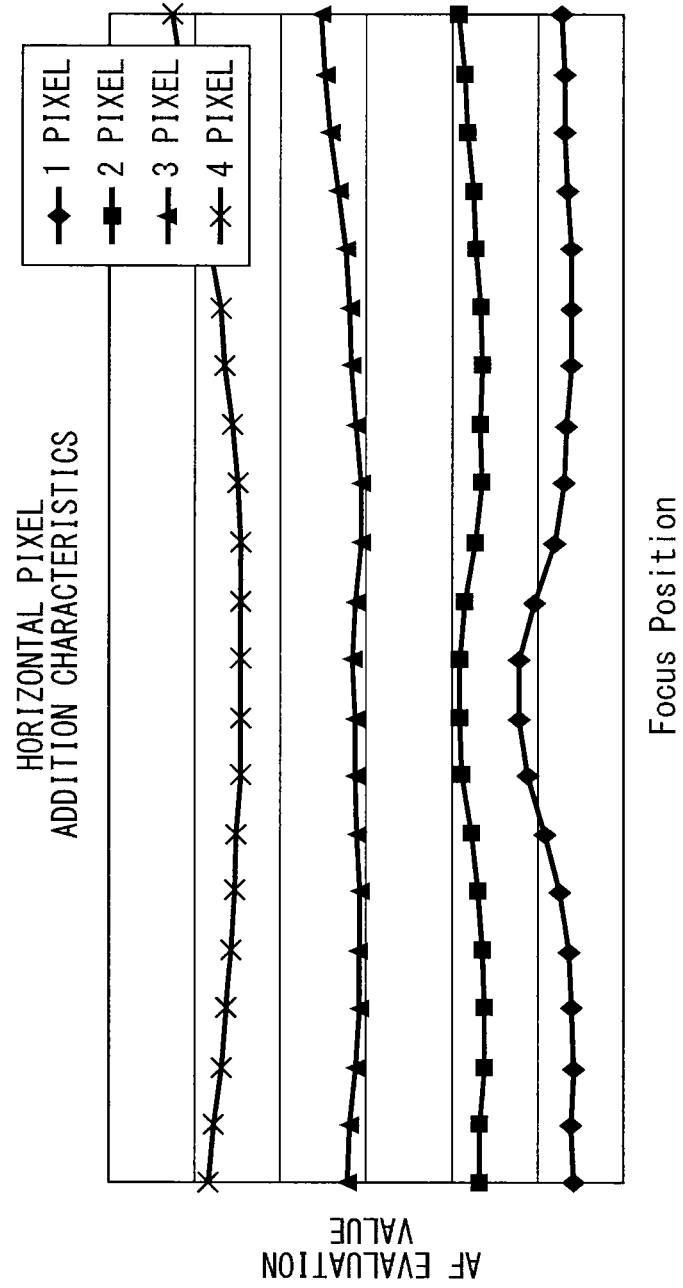
FIG. 23 is a graph showing changes in the AF evaluation value by a difference in the number of horizontal pixel additions of the image sensor.

FIG. 20 is a timing chart showing the relation between the moving timing of the focus lens 72a and the calculation timing of the AF evaluation value. FIG. 20 shows a VD signal (VD) to obtain image data at a certain frame rate, a charge discharge pulse timing (SUB) in the mechanical shutter, exposure timing, and moving timing of the focus lens 72a.

In FIG. 20 triggered by a first VD signal, two drive pulses for the focus motor 72b are generated. In response to the pulses, the focus lens 72a is moved. Also, triggered by the VD signal, a certain number of charge discharge pulses are generated and the charge on the CCD 101 is discharged. After the discharge, an image of a subject is captured as image data by exposure via the imaging lens. The AF evaluation value is calculated by a predetermined operation according to the image data.

The number of drive pulses is variable and changes in accordance with focal length and focus lens protrusion amount or moving range. In the present embodiment autofocus is performed in the driving range of the focus lens 72a in synchronization with the VD signal.

Figure 15:
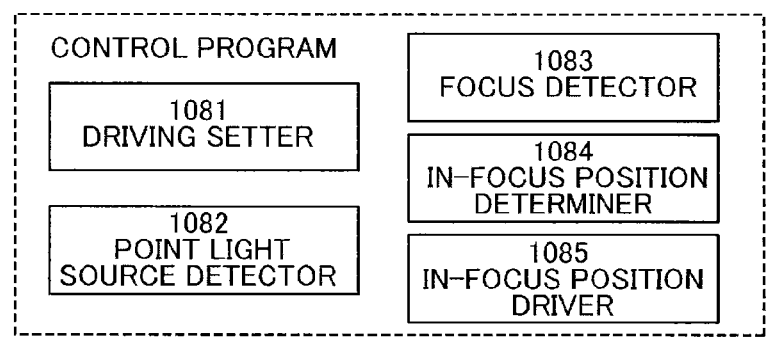
FIG. 15 shows an example of program to execute an imaging method according to one embodiment of the present invention.
Figure 16:
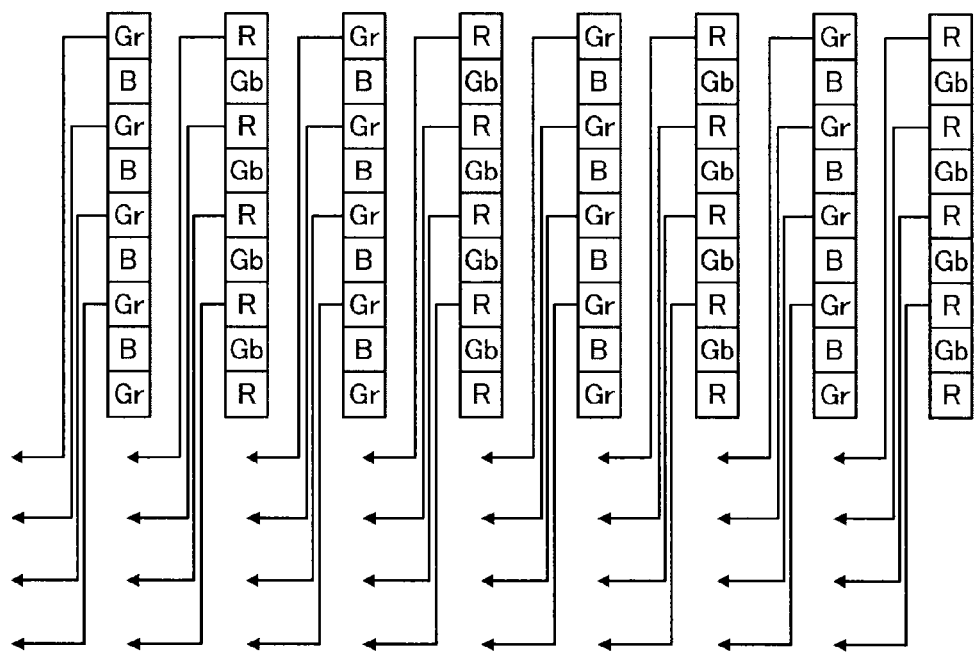
FIG. 16 shows an example of pattern of image signal readout from each pixel of the image sensor.
Figure 17:
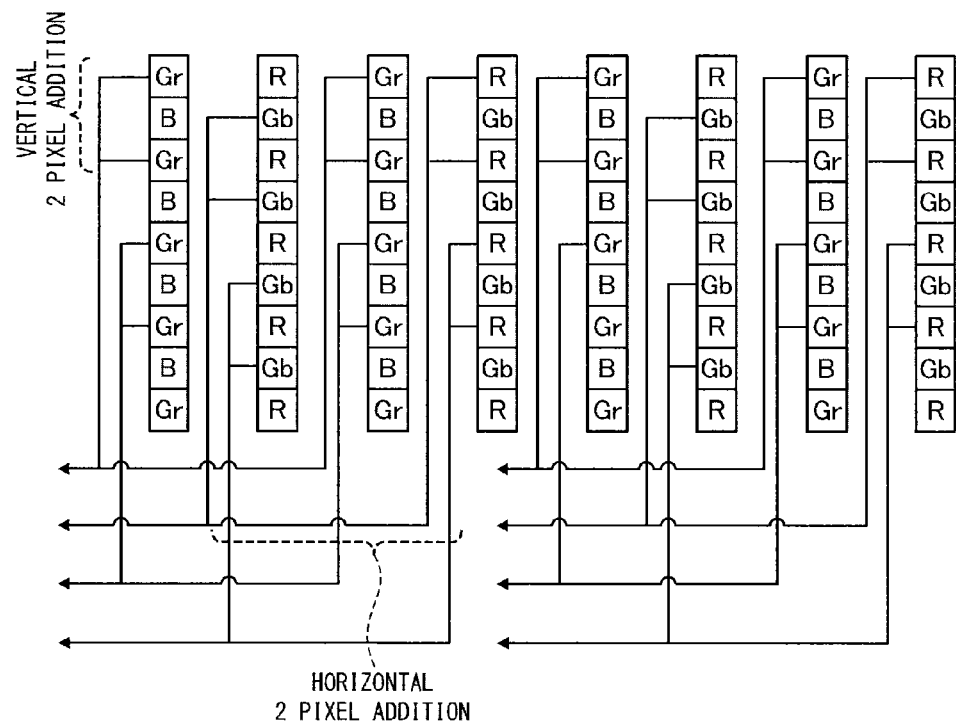
FIG. 17 shows another example of pattern of image signal readout from each pixel of the image sensor.
Figure 18:
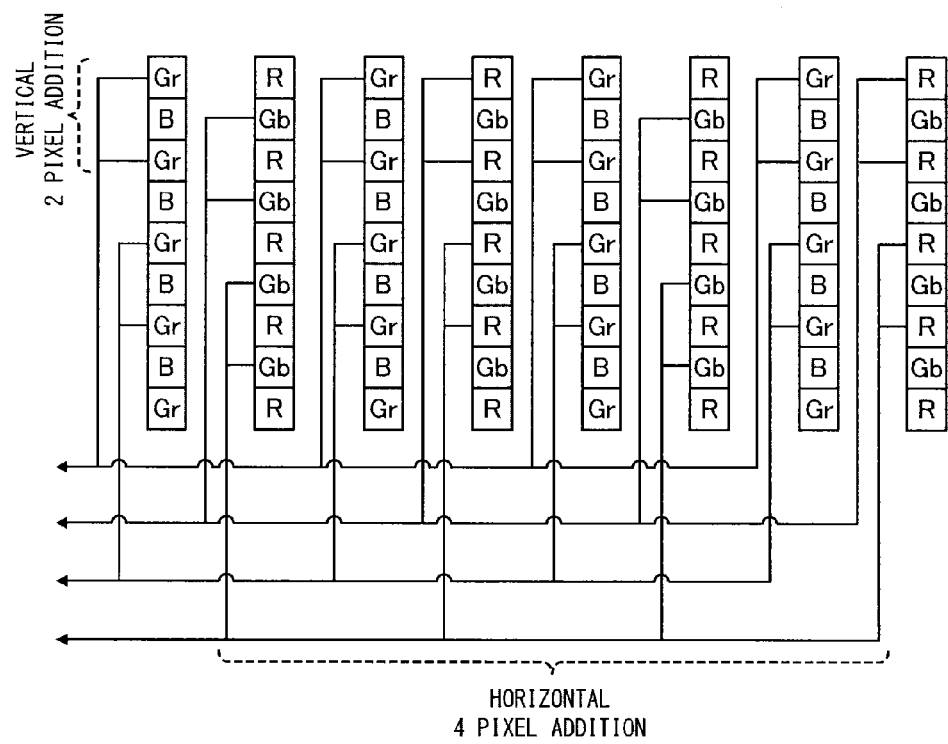
FIG. 18 shows another example of pattern of image signal readout from each pixel of the image sensor.
Figure 19:
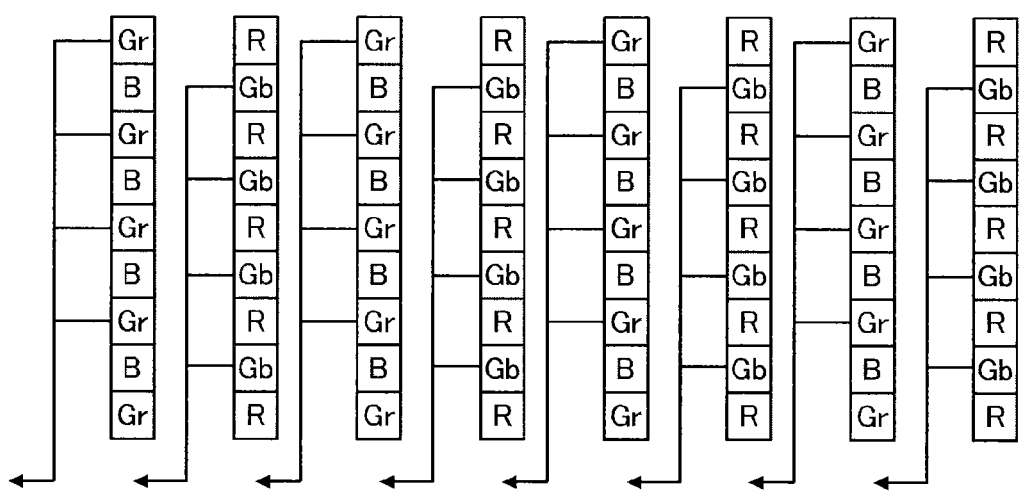
FIG. 19 shows another example of pattern of image signal readout from each pixel of the image sensor.

The AF operation as above is executed by the control program included in the imaging device 1. The control program is stored in the ROM 108 in FIG. 4. FIG. 15 is a function block diagram showing an example of the control program to execute the imaging method according to one embodiment of the present invention.

The control program includes a drive setter 1081, a point source detector 1082, a focus detector 1083 (AF processor), an in-focus position determiner 1084, and an in-focus position driver 1085.

The drive setter 1081 changes the driving mode of the CCD 101.

The point source detector 1082 determines whether or not a subject is in ambient condition in which the point source is dominant.

The focus detector 1083 determines the peak of the AF evaluation value calculated while moving the focus lens 72a.

The in-focus position determiner 1084 makes a final determination on the in-focus position in accordance with the peak determined by the focus detector 1083.

The in-focus position driver 1085 drives the focus motor 72b to the in-focus position determined by the in-focus position determiner 1084.

Second Embodiment

Next, an imaging method according to a second embodiment of the present invention is described. The drive setter 1081, point source detector 1082, AF processor 1083, in-focus position determiner 1084, and in-focus position driver 1085 execute the imaging method.

Figure 6:
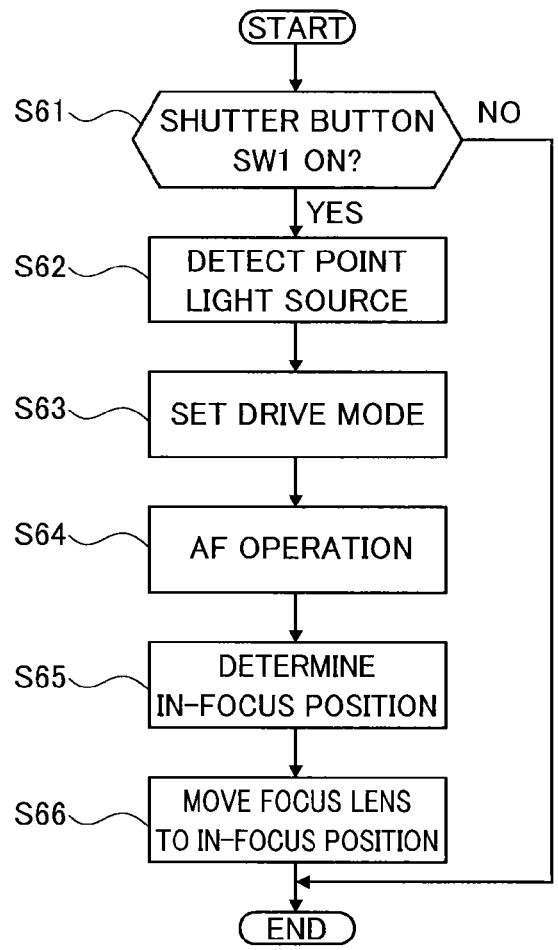
FIG. 6 is a flowchart for the AF operation of the imaging device by way of example.

Referring to FIG. 6, the AF operation of the imaging device 1 is described. First, in step S61 a determination is made on whether or not the shutter button SW1 is pressed. With the shutter button SW1 pressed, the point source detection is performed in step S62. With the shutter button SW1 not pressed, the AF operation completes.

In accordance with a result of the point source detection in step S62, a driving mode is set in the CCD 101 in step S63. In step S64 autofocus is performed under an image signal read condition based on the set driving mode. The point source detection in step S62, driving mode setting in step S63, and AF operation in step S64 are described in detail later.

In step S65 the in-focus position is determined according to the peak of the AF evaluation value determined in step S64. The detected peak is determined to be the in-focus position. When no peak is detected in step S64, "AFNG" is set and a predefined position is determined to be the in-focus position. The predefined position is for example the position of the focus lens 72a at which a subject about 2.5 m away from the imaging device 1 is brought into focus.

In step S66 the focus lens 72a is moved to the determined position.

Figure 7:
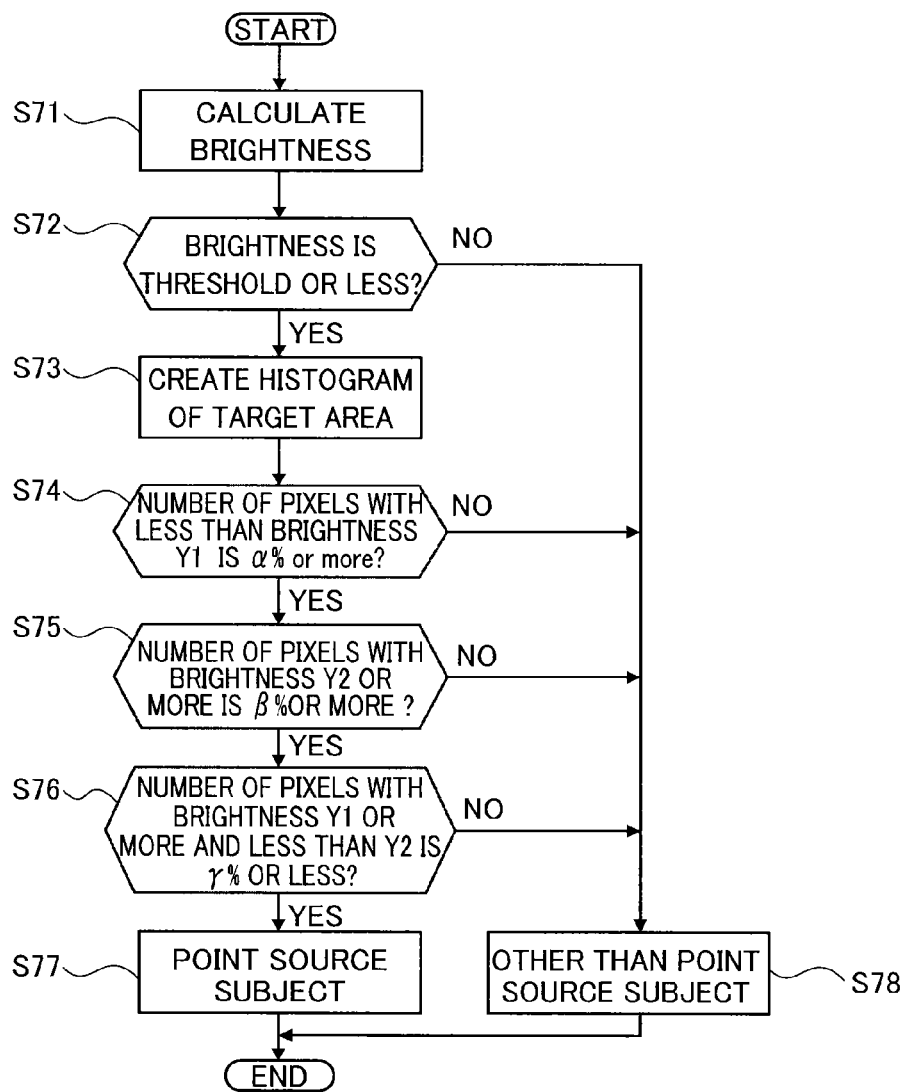
FIG. 7 is a flowchart for the detection of point sources in the imaging device by way of example.

Next, referring to FIG. 7, the point source detection in step S62 is described. In this process a determination is made on whether or not a subject is a point source subject from a distribution in the brightness of the subject. First, in step S71 the brightness of the subject is determined. An example of the YUV image data generated by the YUV converter of the second CCD signal processing block 1042 is shown in FIG. 12. The YUV image data is vertically and horizontally divided into 16 areas each, 256 areas in total.

In the brightness calculation in step S71, the average of brightness values is calculated in each divided area (brightness detection area). The average of brightness is a brightness value normalized by the maximal value of 255. When the average of brightness values is equal to or less than a preset threshold (for example, 60) (Yes in step S72), a histogram of brightness values is created in step S73.

Figure 13:
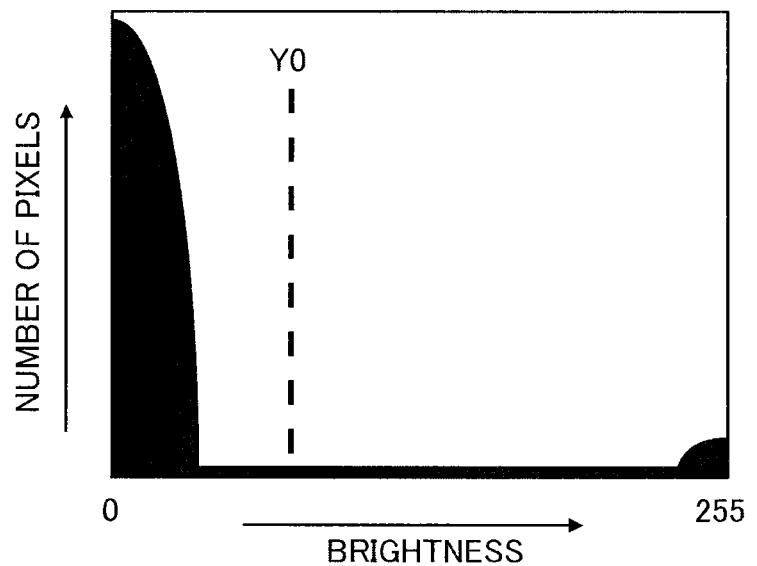
FIG. 13 is a histogram showing a distribution in the brightness of a subject.

FIG. 13 shows an example of the histogram created in step S73 when a subject is a point source subject. The abscissa axis shows the normalized brightness values while the longitudinal axis shows the number of pixels. It can be seen from the graph that the number of pixels with brightness lower than a threshold YO is very large while that of pixels with high brightness is low.

Figure 14:
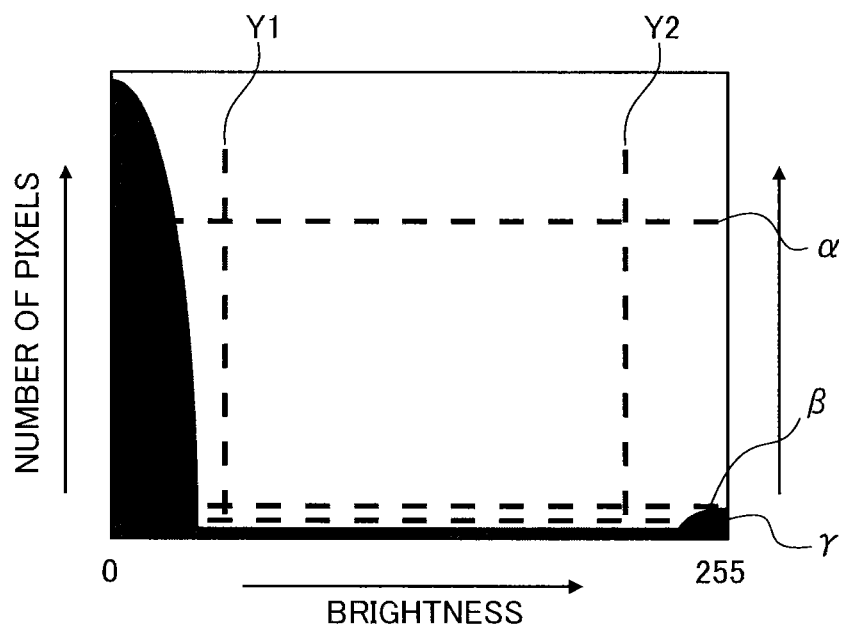
FIG. 14 is a histogram showing an example of threshold used in point source detection relative to a distribution in the brightness of a subject.

Using the histogram in FIG. 13 and plural indexes, a determination is made on whether or not the subject is a point source subject. FIG. 14 shows on the histogram an example of indexes used to determine a point source subject (steps S74 to S76).

In step S74 a determination is made on whether or not the number of pixels with low brightness is a certain number or more, using the threshold Y1 for brightness and the threshold α for the number of pixels. When the number of pixels at less than brightness Y1 is α % or more (Yes in step S74), the flow proceeds to step S75. With No in step S74, the subject is determined to be not a point source subject in step S78 and the point source detection completes.

In step S75 the threshold Y2 for brightness and the threshold β for the number of pixels are used. When the number of pixels with brightness Y2 or more is β % or more (Yes in step S75), the flow proceeds to step S76. With No in step S75, the subject is determined to be not a point source subject in step S78 and the point source detection completes.

In step S76 the brightness thresholds Y1, Y2 and the threshold for the number of pixels γ are used. When the number of pixels with brightness Y1 or more and less than Y2 is γ % (Yes in step S76), the subject is determined to be a point source subject in step S77. With No in step S76, the subject is determined to be not a point source subject in step S78 and the point source detection completes.

As described above, the average of the brightness values of the subject which is mostly point sources is low. Further, in the brightness distribution of the pixels most pixels are with low brightness, the pixels with high brightness correspond to point sources, and almost no pixels with intermediate brightness are present. Thus, the subject is determined as a point source subject through the determination in steps S74 to S76.

Figure 8:
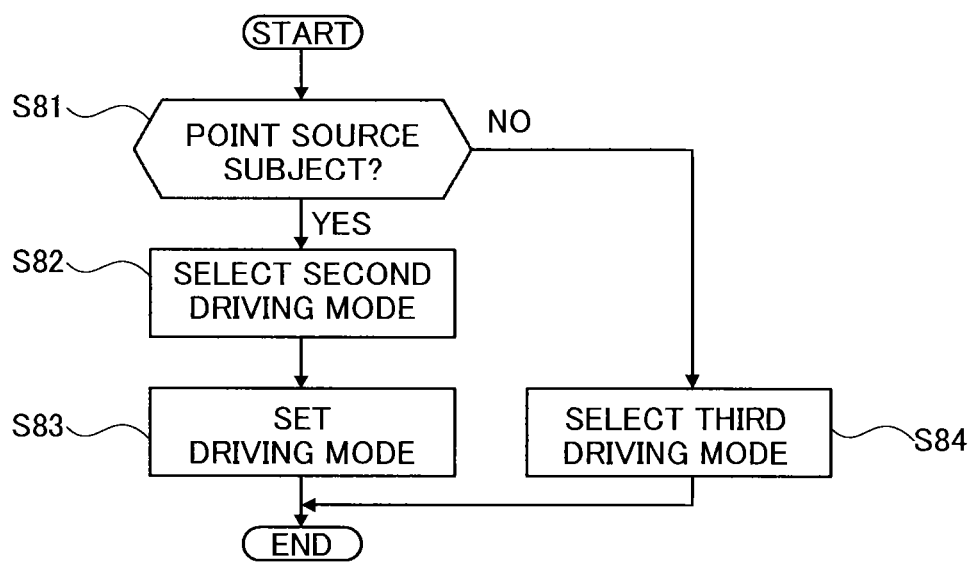
FIG. 8 is a flowchart for setting a driving mode in the imaging device by way of example.

With reference to FIG. 8, the driving mode setting in step S63 is described. When the subject is determined as a point source subject in step S62 (Yes in step S81), the second driving mode is selected for the CCD 101. With no point source subject detected in step S62 (No in step S81), a default mode as the third driving mode is selected for the CCD 101 in step S84. The CCD 101 is set in the selected driving mode in step S83, which completes the driving mode setting.

In the third driving mode the CCD 101 outputs image signals by horizontal four pixel addition and vertical two pixel thinning. In the second driving mode the CCD 101 outputs image signals by horizontal two pixel addition and vertical two pixel addition. That is, four pixels are added to be one pixel to output an image signal so that the number of pixels on image data is different from the actual number of pixels of the CCD 101. However, the sensitivity of the image sensor does not change.

Now, referring to FIGS. 24A to 26C, a change in the AF evaluation value due to a difference in the driving modes is described. FIGS. 24A to 24C are graphs showing a change in the AF evaluation value calculated while the number of horizontal pixel additions is changed relative to the same subject. FIGS. 24 to 24C show the examples of two pixel addition, four pixel addition, and no addition, respectively. In the graphs the abscissa axis shows focus lens position and the longitudinal axis shows AF evaluation value.

With no pixel addition in FIG. 24C, the peak of the AF evaluation value is at almost the center of the lens position while with the four pixel addition (third driving mode) in FIG. 24B, the AF evaluation value is lowest at the same lens position and with the two pixel addition in FIG. 24A, the peak is at almost the center of the lens position. Thus; it is made possible to accurately perform AF operation to a point source subject by changing the number of horizontal pixels added.

A difference between the third and fourth driving modes and the second driving mode is in the total number of pixels in addition to the number of additions. In the second driving mode it takes more time to transfer image signals than in the third driving mode. Compared with the viewfinder mode at 30 fps in which the CCD 101 is operated in the third driving mode, the frame rate is slower in the second driving mode. To deal with a slower frame rate, vertical pixels can be thinned to increase the frame rate.

Figure 10:
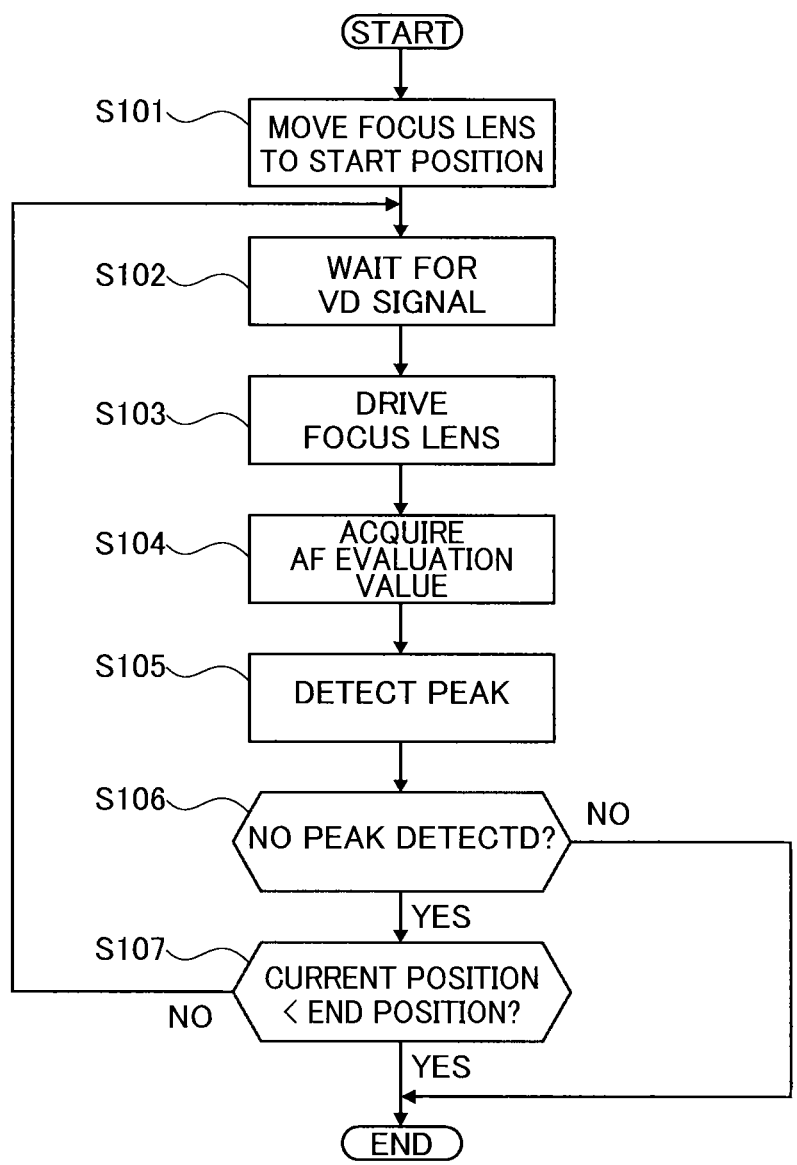
FIG. 10 is a flowchart for AF scan operation in the imaging device by way of example.

Next, the AF operation in step S64 is described in detail with reference to FIG. 10. The driving mode of the CCD 101 is set in step S63.

In step S101 the focus lens 72a is moved to an AF start position. The AF start position differs depending on the direction in which the focus lens is driven. Herein, the focus lens is assumed to move from close to infinite and the AF start position is on the close side. The close-side AF start position changes depending on focal length and lens characteristics, and it is, for example, 30 cm.

In step S102 the operation waits for detection of a falling of the VD signal. Upon detection of the falling of the VD signal, the focus motor 72b is driven to move the focus lens 72a in accordance with a predetermined number of pulses in step S103.

At the position to which the focus lens 72a is moved, an image signal is acquired from the CCD 101 in the driving mode set in step S63 in FIG. 6. The AF evaluation value is calculated from image data based on this image signal in step S104.

In step S105 the peak or maximal value of the calculated AF evaluation value is detected. In step S106 a determination is made on whether or not the peak of the AF evaluation value is detected. With no peak of the AF evaluation value detected (Yes in step S106), a determination is made on whether or not the current position of the focus lens 72a is an AF end position in step S107. When the focus lens 72a is not at the AF end position (No in step S107), the flow returns to step S102 and waits for the falling of the VD signal and the above operation is repeated to detect the peak of the AF evaluation value. When the peak is detected (No in step S106), the AF operation completes.

According to the present embodiment as above, when a subject is determined to be a point source subject, the driving mode of the image sensor is changed from the default mode to the other modes for the AF operation to improve the sensitivity and brightness. Thereby, it is possible to automatically, accurately place a point source subject in focus, which is not possible in the prior art AF operation since it cannot detect the peak of the AF evaluation value and identify the in-focus position for the point source subject.

Third Embodiment

Figure 9:
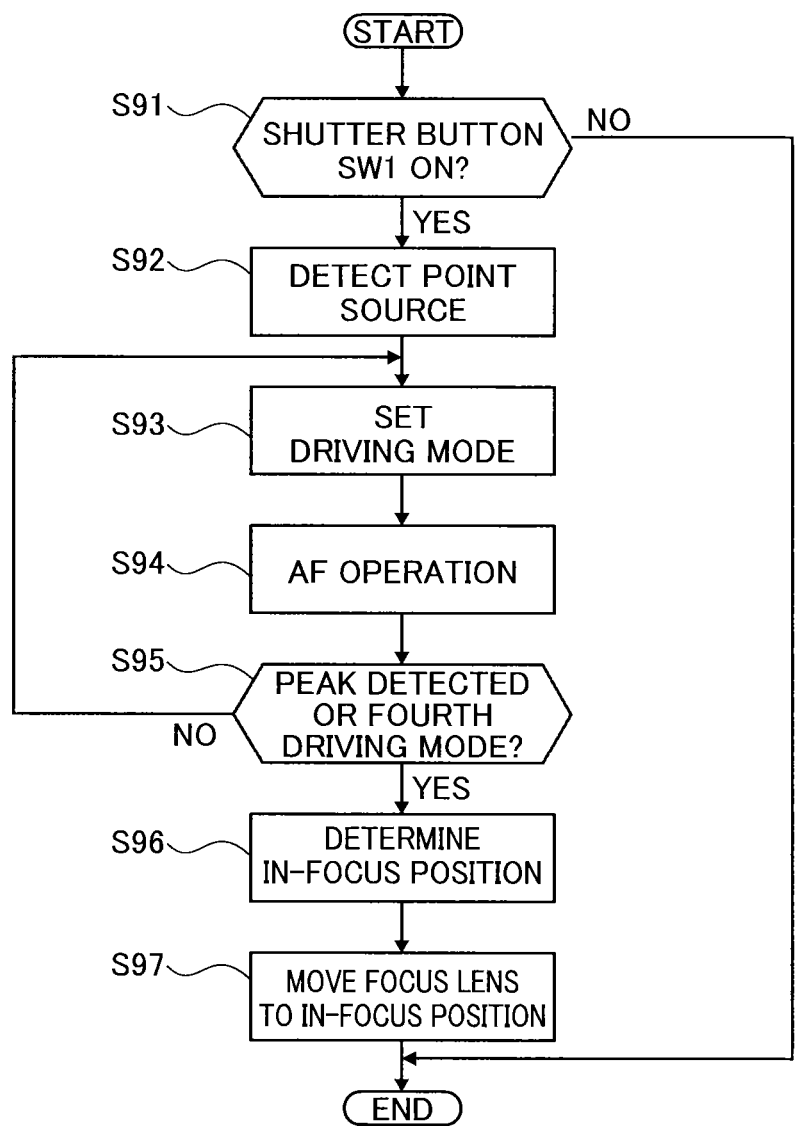
FIG. 9 is a flowchart for another example of AF operation.

Next, another example of the imaging method is described. First, the AF operation is described with reference to FIG. 9. In step S91 a determination is made on whether or not the shutter button SW1 is pressed. With the shutter button SW1 pressed (Yes in step S91), the point source detection is performed in step S92. With the shutter button SW1 not pressed (No in step S91), the AF operation completes.

In accordance with a result of the point source detection in step S92, the driving mode of the CCD 101 is set in step S93. In step S94 autofocus is performed under an image signal read condition based on the set driving mode. The point source detection in step S92 and AF operation in step S94 are the same as those in steps S62 and S64 so that a description thereof is omitted. The driving mode setting in step S93 is described in detail later.

When the peak of the AF evaluation value is detected in step S94 or the driving mode set in step S93 is the fourth driving mode (Yes in step S95), in step S96 the in-focus position is determined according to the peak of the AF evaluation value determined in step S94. The lens position at which the peak is detected is determined to be the in-focus position.

When no peak is detected in step S94, "AFNG" is set and a predefined position is determined to be the in-focus position. The predefined position is for example the position of the focus lens 72a at which a subject about 2.5 m away from the lens position is brought in focus.

In step S97 the focus lens 72a is moved to the in-focus position in step S97. With No in step S95, the driving mode is set again in step S93 and the AF operation is re-executed.

Figure 11:
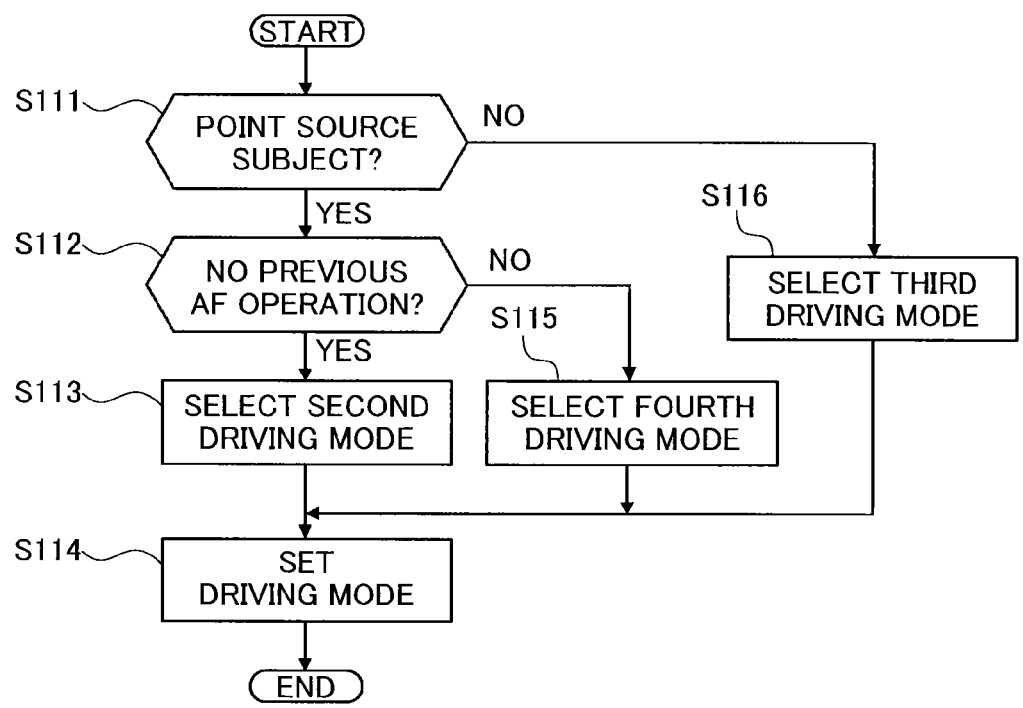
FIG. 11 is a flowchart for another example of driving mode setting.

Now, the driving mode setting in step S93 is described in detail, referring to FIG. 11. When the subject is determined to be a point source subject (Yes in step S111), a determination is made on whether the AF operation was not previously executed in step S112. With no previous AF operation (Yes in step S112), the second driving mode is selected for the CCD 101 in step S113.

The fact that the AF operation was previously executed (No in step S112) means that the peak of the AF evaluation value could not be detected in the second driving mode. In this case, therefore, the fourth driving mode is selected in step S115. When the subject is determined to be not a point source subject (No in step S111), the third driving mode is selected in step S116. The selected driving mode is set in the CCD 101, which completes the driving mode setting.

The third driving mode is the default mode of the CCD 101 as image sensor, in which the CCD 11 is operated by horizontal four pixel addition and vertical two pixel thinning and the number of pixels added is four. In the second driving mode by horizontal two pixel addition and vertical two pixel addition, the number of pixels added is four (2 by 2). The number of pixels added is different in the second driving mode and the fourth driving mode which is by no horizontal pixel addition and vertical four pixel addition, however, the sensitivity of the CCD 101 does not change.

As described above, the change characteristics of the calculated AF evaluation value differ depending on the driving mode of the CCD 101, as shown in FIGS. 24A to 24C. Therefore, it is possible to accurately perform autofocus to point source subjects by changing the number of horizontal pixel additions.

According to the above embodiments, the imaging device 1 is configured to change the number of horizontal pixel additions for the AF operation when a point source is detected. Therefore, it can accurately detect the peak of the AF evaluation value of a point source subject, which cannot be achieved in prior art. Further, by changing the number of pixels added when appropriate, autofocus is more precisely performed on the subjects whose peak of the AF evaluation value cannot be detected.

Thus, the imaging device according to any of the above embodiments can precisely perform autofocus on the subjects in low contrast or including a dominant point source by changing the driving mode of the image sensor and the number of horizontal pixel additions.

Although the present invention has been described in terms of exemplary embodiments, it is not limited thereto. It should be appreciated that variations or modifications may be made in the embodiments described by persons skilled in the art without departing from the scope of the present invention as defined by the following claims.

What is claimed is:

1. An imaging device comprising:
an imaging lens;
an image sensor to output an image signal in accordance with an image of a subject captured via the imaging lens;
a lens driver to move the imaging lens;
an autofocus detector to determine a focal point according to image data obtained from the image signal;
a point source detector to determine whether or not a subject is a point source subject on the basis of a brightness component included in the image data; and
a driving mode setter to change a driving condition of the image sensor when the subject is determined to be a point source subject,
wherein the driving condition of the image sensor is a number of pixels added and a number of pixels thinned in vertical and horizontal directions of the image sensor.

2. An imaging device according to claim 1, wherein the driving condition of the image sensor is a number of pixels added in a horizontal direction of the image sensor.

3. An imaging device according to claim 1, wherein the driving mode setter is configured to change the driving condition when the autofocus detector cannot detect a focal point after the driving condition is changed.

4. An imaging device according to claim 1, wherein the point source detector determines whether or not the subject is a point source subject according to a distribution in the brightness component.

5. An imaging method comprising the steps of:
capturing an image of a subject;
outputting an image signal with an image sensor, in accordance with the captured subject image;
determining a focal point according to image data obtained from the image signal;
determining whether or not a subject is a point source subject on the basis of a brightness component included in the image data; and
changing a driving condition of an image sensor when the subject is determined to be a point source subject
wherein the driving condition of the image sensor is a number of pixels added and a number of pixels thinned in vertical and horizontal directions of the image sensor.

* * * * *